United States Patent
Nakashima et al.

(10) Patent No.: US 6,299,198 B1
(45) Date of Patent: Oct. 9, 2001

(54) PASSENGER-SIDE AIRBAG SYSTEM

(75) Inventors: Yoshiharu Nakashima; Mitsuo Yasuda, both of Toyama-Ken (JP)

(73) Assignee: Sanko Gosei Kabushiki Kaisha, Toyama-Ken (JP)

( * ) Notice: Subject to any disclaimer, the term of this patent is extended or adjusted under 35 U.S.C. 154(b) by 0 days.

(21) Appl. No.: 09/256,425

(22) Filed: Feb. 23, 1999

(51) Int. Cl.$^7$ ............................. B60R 21/20; B60R 21/16
(52) U.S. Cl. ................................ 280/728.3; 280/728.2; 280/732
(58) Field of Search ............................. 280/728.3, 732, 280/728.2, 730.1

(56) References Cited

U.S. PATENT DOCUMENTS

| | | |
|---|---|---|
| 5,238,264 | 8/1993 | Barnes . |
| 5,322,324 * | 6/1994 | Hansen et al. ................. 280/732 |
| 5,332,324 | 7/1994 | Hochstetler . |
| 5,342,085 | 8/1994 | Hirashima et al. . |
| 5,429,385 | 7/1995 | Kamiji et al. . |
| 5,549,324 | 8/1996 | Labrie et al. . |
| 5,662,350 * | 9/1997 | Bathon et al. ................. 280/732 |
| 5,738,366 | 4/1998 | Phillion . |
| 5,744,776 * | 4/1998 | Bauer ......................... 280/728.3 |
| 5,803,489 * | 9/1998 | Nusshor ...................... 280/728.3 |
| 5,816,609 | 10/1998 | Gray et al. . |
| 5,863,064 * | 1/1999 | Rheinlander et al. ........... 280/732 |
| 5,871,229 * | 2/1999 | Saito .......................... 280/728.3 |
| 5,961,142 * | 10/1999 | Shiraki et al. ................. 280/728.3 |
| 6,012,735 * | 1/2000 | Gray et al. .................... 280/732 |
| 6,131,945 * | 10/2000 | Labrie et al. .................. 280/728.3 |
| 6,158,763 * | 12/2000 | Dominique et al. ............ 280/728.2 |

FOREIGN PATENT DOCUMENTS

| | | |
|---|---|---|
| 19 654 452 | 1/1998 | (DE) . |
| 19 735 438 | 2/1999 | (DE) . |
| 0 967 066 | 12/1999 | (EP) . |
| 0 711 627 | 7/2000 | (EP) . |

* cited by examiner

Primary Examiner—Brian L. Johnson
Assistant Examiner—Joselynn Y Sliteris
(74) Attorney, Agent, or Firm—Ladas & Parry

(57) ABSTRACT

An airbag system is provided which has an instrument panel cover provided with a favorable appearance and enables to protect a passenger sitting on the front passenger seat at an instance of collision. To have such favorable appearance, the cover is combined by mold forming with a lid plate located opposite to an opening of an airbag case as a single unit. The lid plate is arranged having its outer edge decreased in the physical strength. While a main body of a lid plate reinforcement made of a metallic material is joined by thermal bonding to the back side of a region inside the outer edge of the lid plate, a hinge extending outward from the main body is fixedly joined by a bracket to the airbag case so that the hinge, when the airbag element accommodated in the airbag case inflates, can be bent upward to lift or open up the lid plate. Accordingly, the cover when broken out is prevented from generating sharp edges or scattering broken pieces.

5 Claims, 5 Drawing Sheets

PASSENGER-SIDE AIRBAG SYSTEM

BACKGROUND OF THE INVENTION

1. Field of the Invention

The present invention relates to a passenger-side airbag system for use in a vehicle such as an automobile to protect a passenger seated on the front seat from any potential impact in an accident for more safety.

2. Description of the Related Art

A conventional passenger-side airbag system for an automobile comprises, as shown in FIG. 1, an instrument panel cover 1, an instrument panel core 2 provided in the front of the cover 11, both anchored by appropriate means, and an airbag case 3 provided at an appropriate location between the cover 1 and the core 2. The case 3 is joined to the cover 1. The cover 1 has an opening 1a therein closed with a lid plate 4 which is supported at its circumferential edge by an outer region about the opening 1a of the cover 1. The lid plate 4 has an upper 4a and a lower mounting leg 4b extending from the back side thereof and held with the case 3. Also, a thinned portion 4c is provided at the proximal end of the lower mounting leg 4b. An airbag element (not shown) folded into a minimum is accommodated in the interior space defined by the case 3 and the lid plate 4 and is connected to an inflator (not shown).

When a collision of the automobile occurs, its degree is detected by a sensor(s) which then transmits a signal to the inflator. In response, the inflator generates and delivers an amount of gas to the airbag element which in turn inflates instantly to protect the chest or head of the passenger from injury.

However, the conventional passenger-side airbag system described above permits the lid plate 4 to cover the opening 1a of the instrument panel cover I and thus project outwardly as a separate component from the cover 1 towards the interior space of the automobile or vehicle, hence providing an unfavorable appearance. Also, as the airbag element is instantly inflated by the supply of gas upon collision, it breaks down the thinned portion 4c at the lower mounting leg 4b of the lid plate 4 and abruptly lifts up the lid plate 4, thus reducing the protection of the passenger sitting in the passenger seat.

SUMMARY OF THE INVENTION

It is an object of the present invention to provide a passenger-side airbag system adapted for having the lid plate formed as a part of the instrument panel cover so that the appearance of the cover section viewed from the interior space of a vehicle can be improved and made as good looking as possible and the damage to a passenger sitting on the front passenger seat can be minimized in order to overcome the above drawbacks and to ensure the protection of the passenger.

DETAILED DESCRIPTION OF THE PREFERRED EMBODIMENTS

A passenger-side airbag system according to an embodiment of the present invention will be described referring to the accompanying drawings.

Figure 1:
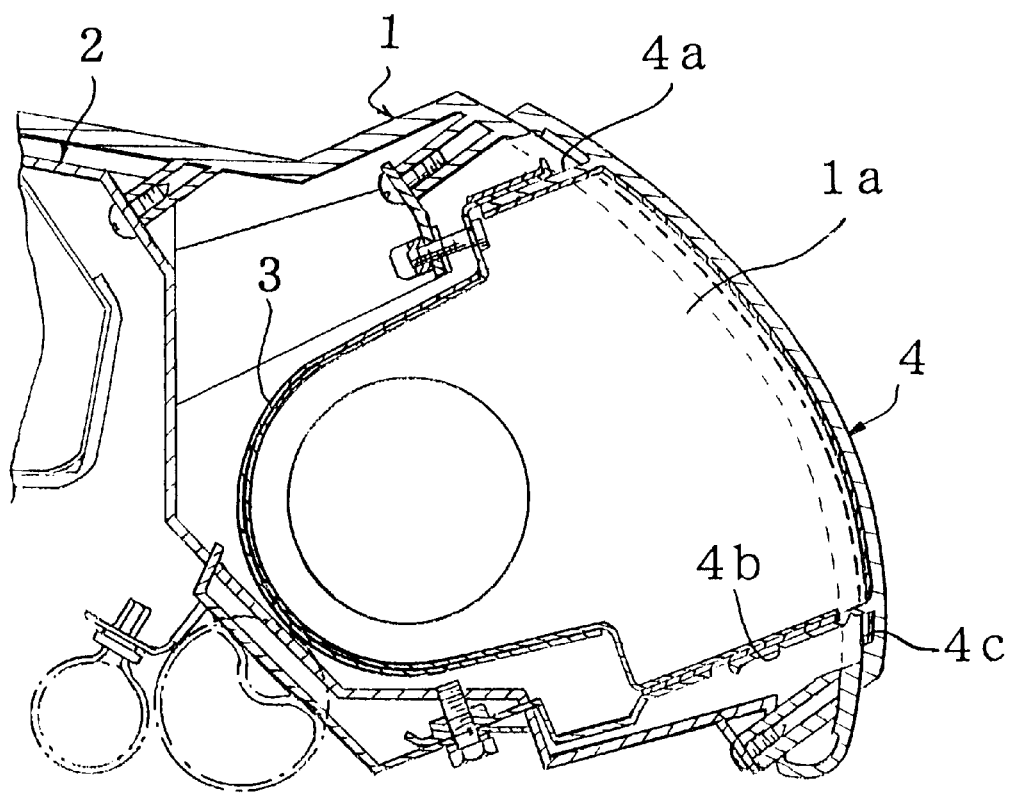
FIG. 1 is a cross sectional view of a conventional passenger-side airbag system.
Figure 2:
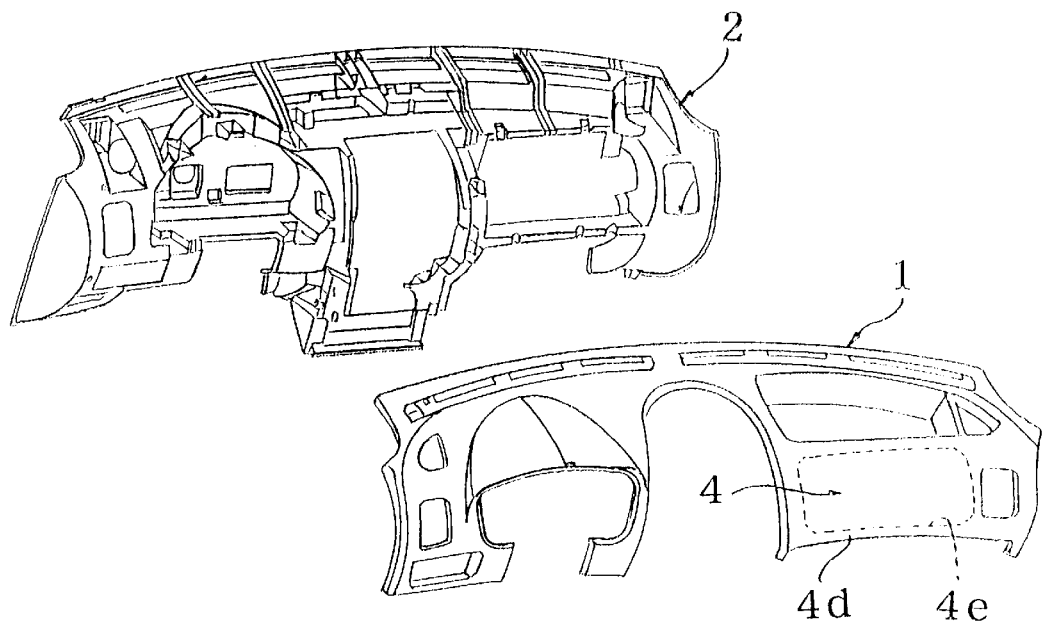
FIG. 2 is an exploded perspective view showing a primary section of a passenger-side airbag system according to one embodiment of the present invention.
Figure 3:
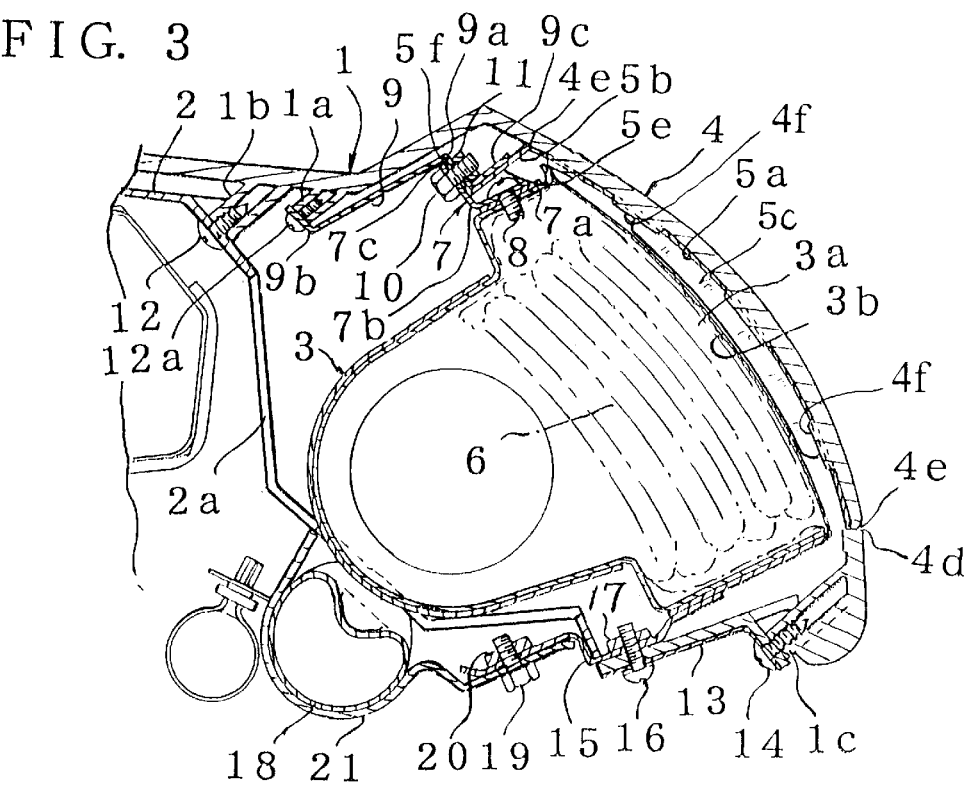
FIG. 3 is a cross sectional view of the passenger-side airbag system shown in FIG. 2.

As shown in FIGS. 2 and 3, there are provided an instrument panel cover 1 and an instrument panel core 2 which both are made of molded forms of synthetic resin for a vehicle with the steering-wheel on the left side.

The cover 1 is combined as a single unit with a lid plate 4 which is located in the right side facing the front passenger seat. A plurality of perforations 4e are provided by laser cutting at intervals of a proper distance at the outer edge of the lid plate 4, extending circumferentially in a broken line or a dotted line. The lid plate 4 has substantially a rectangular shape extending longer in leftward and rightward directions.

The cover 1 is anchored to the instrument panel core 2 by appropriate means such as screws 12 through the boss 1b protrudently provided on the back side of cover 1. An airbag case 3 is mounted between the lid plate 4 of the cover 1 and a lower right region of the core 2. The airbag case 3 has a rectangular opening 3a provided therein to be opposite the back side of a main body 5a of a lid plate reinforcement 5 fixedly mounted to the back side (at front) of the lid plate 4. The case 3 contains therein an airbag element 6 lodged in a folded or minimized form. The airbag element 6 is connected to an inflator (gas generator), not shown, also accommodated in the case 3.

An airbag protecting cover 3b is installed in the opening 3a of the case 3 for preventing popping-out of the airbag element 6 in its no-use mode. The airbag protecting cover 3b is made from a thin chemical fiber web which can easily be torn off when the airbag element 6 inflates.

Figure 4:
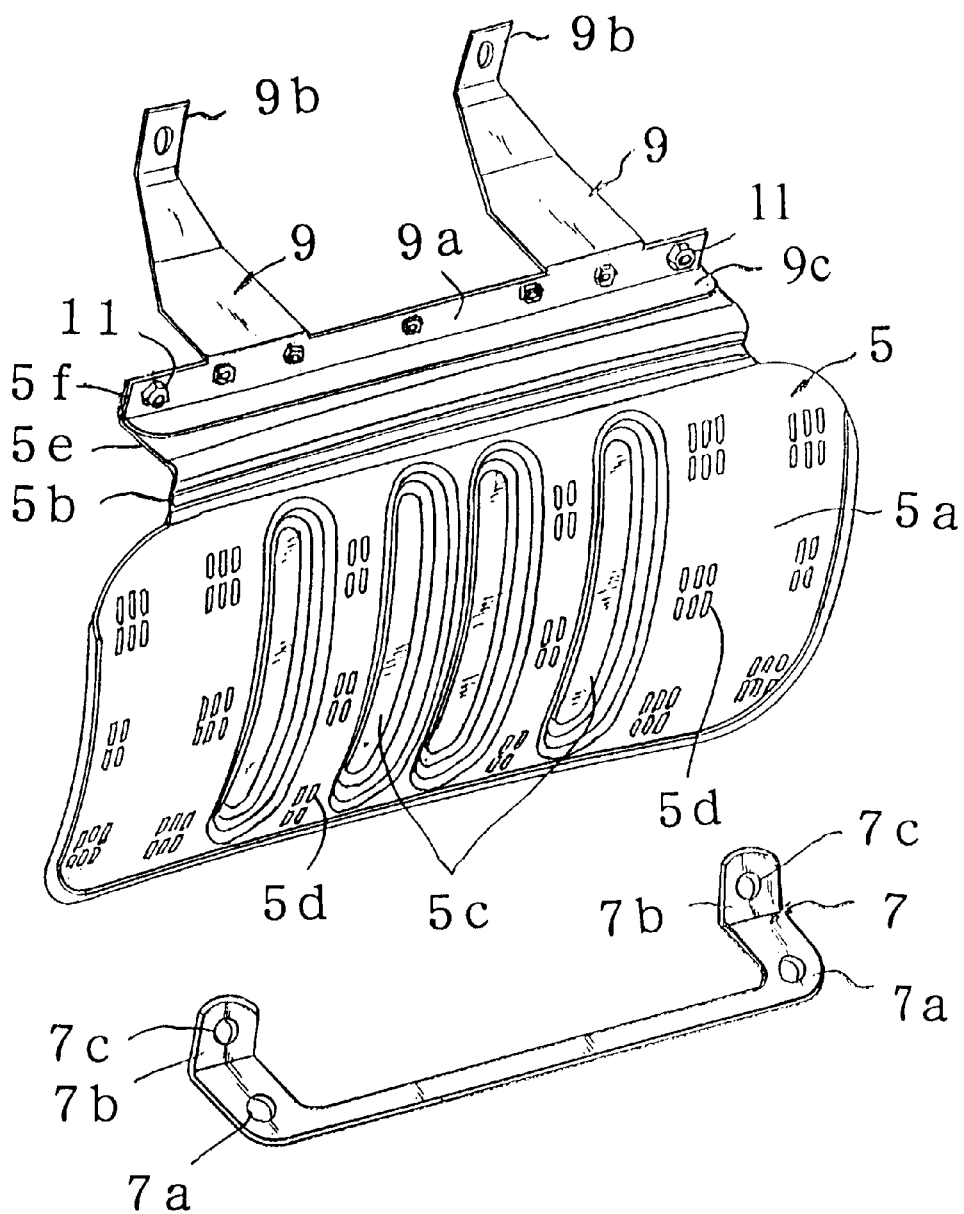
FIG. 4 is an enlarged perspective view of a lid plate reinforcement, a joiner, and a bracket of the passenger-side airbag system shown in FIG. 2.

The lid plate 4 and the main body 5a of the lid plate reinforcement 5 shown in FIG. 4 have an arcuate shape in the cross section tilting towards the back side. The main body 5a is sized smaller than the outer edge 4d of the lid plate 4. A hinge 5b is provided on the lengthwise center of the upper end of the main body 5a, of which the length extending in the leftward and rightward directions is smaller than that of the main body 5a. The main body 5a has a plurality of width wisely (i.e. vertically) extending reinforcement recesses 5c provided therein and spaced from each other along the leftward and rightward directions. Plural sets of vertically extending slots 5d are provided between the recesses 5c and outside the leftmost and rightmost recesses 5c, each set consisting of two, upper and lower, rows of slots closely spaced along the leftward and rightward directions. The slots 5d are fixedly joined by thermal bonding with vertically extending ribs 4f provided on the back side (at front) of the lid plate 4 of the cover 1. An upright extension 5f is provided upwardly extending from an intermediate portion 5e of the lid plate reinforcement 5 which is inwardly bent from the hinge 5b.

A bracket 7 of substantially a C shape is mounted and joined at two, left and right, ends to an upper region of the case 3 adjacent the opening 3a. More particularly, two, left and right, mounting portions 7a of the bracket 7 are tightened by screws 8 to the back side of the case 3. With upper joining portions 7c at two, left and right, upright tabs 7b of the bracket 7 joined directly to the upright extension 5f at the hinge 5b of the lid plate reinforcement 5 and a distal portion 9a of a joiner 9, which has substantially an L shape in cross section, joined directly to the back side of the hinge 5b and the outer side of the upright extension 5f of the lid plate reinforcement 5, the upper joining portions 7c of the bracket 7, the upright extension 5f of the lid plate reinforcement 5, and the distal portion 9a of the joiner 9 are fixedly assembled together by bolts 10 and nuts 11.

Two, left and right, proximal portions 9b extend from left and right regions of the distal portion 9a of the joiner 9 to support the back side of a boss portion 1a of the cover 1. The left and right proximal portions 9b of the joiner 9 are tightened to the boss portion 1a of the cover 1 by screws 12a inserted from the front.

The core 2 is sits at the lower end on a core reinforcement 13 and is tightened to projections 1c of the cover 1 (which extend towards the lower front side of the lid plate 4) with screws 14 inserted from the front of the core I reinforcement 13 and the cover 1.

The core 2 has an opening 2a provided therein for allowing the airbag case 3 to pass through from the left lower of FIG. 3 and access to the back side of the instrument cover 1.

A support plate 15 is joined via the core 2 to the upper front of the core reinforcement 13 by bolts 16 extending from below through the core reinforcement 13, the core 2, and the support plate 15 and tightened with corresponding nuts 17 so that the rear end of the support plate 15 is supportingly secured with the lower of the airbag case 3. In particular, the support plate 15 is loosely fitted to the core 2, hence extending to the front side outwardly of the case 3. A belt-like strip 21 fixedly joined at its front end to the core 2 is tightened at its rear end by bolts 19 and nuts 20 to the front end of the support plate 15 so that a gas supply pipe 18 for introducing a flow of gas from the inflator, not shown, is accommodated at a correct position in the case 3.

The lid plate reinforcement 5, the bracket 7, the joiner 9, the core reinforcement 13, and the support plate 15 are made of steel strips of 0.5 mm, 1.5 mm, 1.0 mm, 1.0 mm, and 1.5 mm in thickness, respectively.

The passenger-side airbag system of the embodiment of the present invention permits the airbag element 6 to be accommodated in its folded form between the airbag case 3 and the lid plate 4 formed as an integral part of with the instrument panel cover 1 while the protecting cover 3b provided in the opening 3a of the airbag case 3 remains confined and pressed down by the recesses 5c of the lid plate reinforcement 5.

Accordingly, popping out of the airbag element 6 will be prevented. The recesses 5c of the lid plate reinforcement 5 give more strength on the lid plate 4 against undesired impact and prevent the airbag element 6 from coming into direct contact with the thermal bonding regions of the lid plate reinforcement 5 when it inflates. Also, the lid plate 4 is formed as a part of the cover 1 hence ensuring the favorable appearance.

In case the vehicle is involved in a collision, its known sensor (not shown) detects the degree of collision and delivers a corresponding signal to the inflator (gas generator (not shown)). Upon receiving a certain amount of gas from the inflator, the airbag element 6 breaks up the airbag protecting cover 3b and inflates to hold the chest and head of a passenger sitting at the front passenger seat, thus protecting the passenger and providing safety.

Figure 5:
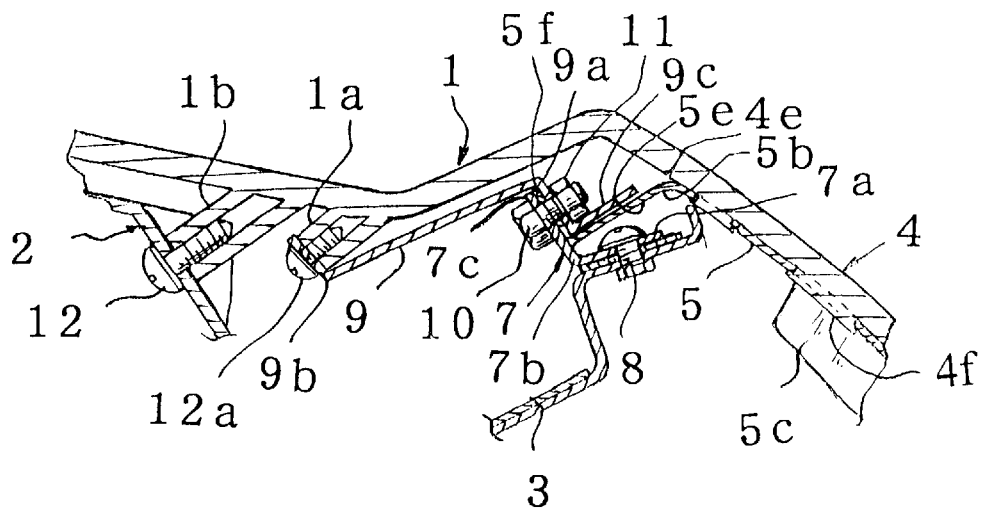
FIG. 5 is an explanatory view showing a primary section of the passenger-seat airbag system shown in FIG. 3 in a non-operating mode.
Figure 6:
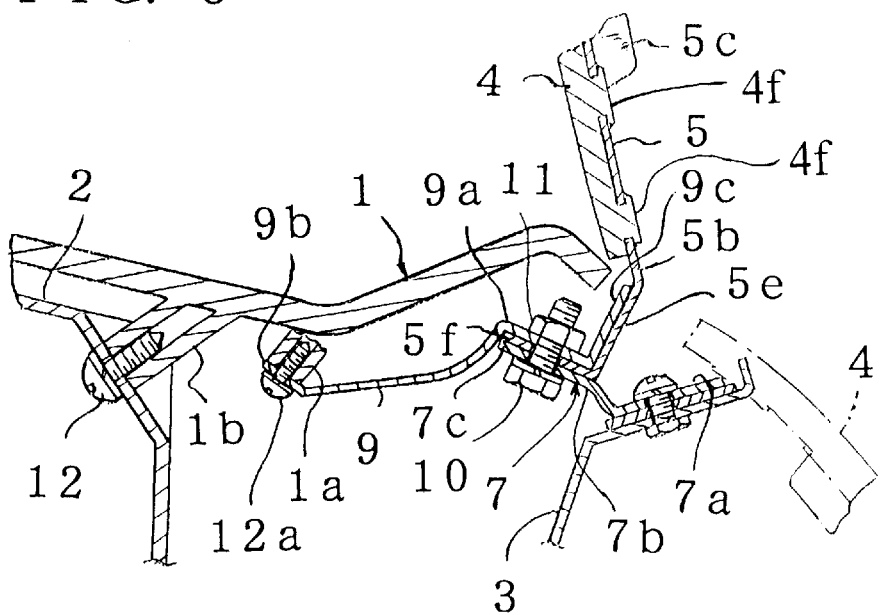
FIG. 6 is an explanatory view showing the primary section of the passenger-seat airbag system shown in FIG. 3 in an operating mode.
Figure 7:
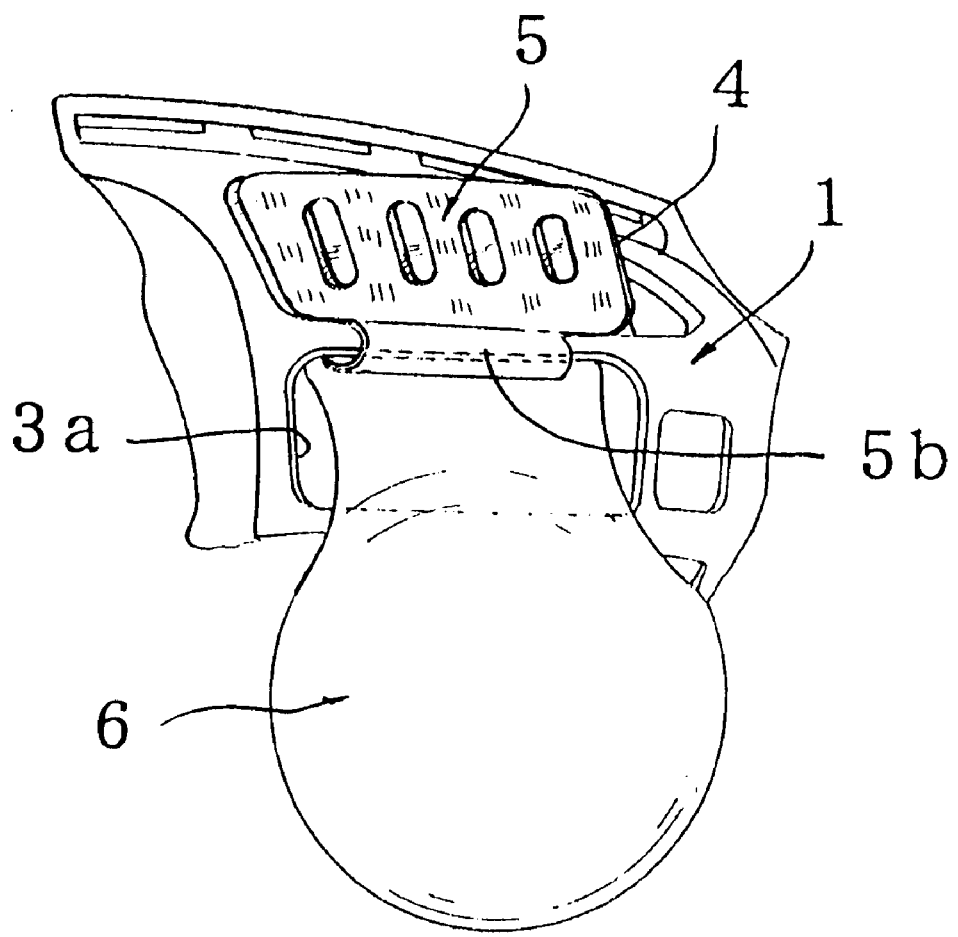
FIG. 7 is an enlarged view of the primary section of the passenger-seat airbag system shown in FIG. 3 in the operating mode.

More particularly, the inflation of the airbag element 6 by supply of the gas moves the lid plate 4 formed as an integral part of the cover 1 outwardly. As shown in FIGS. 5 and 6, the hinge 5b communicated with the upper portion of the main body 5a can be bent at a bent extension 9c of the joint 9 upwardly to lift or open up both the lid plate 4 and the main body 5a of the lid plate reinforcement 5 fixedly mounted to the back side of the lid plate 4. In this case, even if the boss 1a of the cover 1 fixed to the distal portion 9b might be broken off, the cover 1 is not deformed and is prevented from generating sharp edges of scattering broken pieces. As a result, a part of the airbag element 6 inflating is expanded behind the cover I hence cushioning the abrupt collision of the chest and head of the passenger with the cover 1 and the main body 5a of the lid plate reinforcement 5.

While the airbag element 6 is inflating, it produces a pressure against the airbag case 3 to deform the opening 3a. The C-shaped bracket 7 having two, left and right, arms in a single unit and fitted from behind into the opening 3a absorbs the pressure by deflecting its joint portion between the left and right arms, hence preventing the hinge 5b of the lid plate reinforcement 5 from creating any unwanted effect such as distortion.

The perforations 4e are provided in a row extending along the outer edge 4d of the lid plate 4 to reduce the physical strength of the outer edge 4d while the hinge 5b at the top of the main body 5a of the lid plate reinforcement 5 is shorter in the length defined in the leftward and rightward directions than the main body 5a. This allows the lid plate 4 and the main body 5a of the lid plate reinforcement 5 to be definitely lifted up as turned through a large degree of angle. Also, the perforations 4e facilitate breakage of the cover 1 mounted on the outer side of the lid plate 4 thus minimizing the generation of sharp broken edges or the separation of broken pieces and ensuring the safety of the passenger sitting in the front passenger seat.

Also, the upright extension 5f extending from the hinge 5b of the lid plate reinforcement 5 is fixedly joined with the joining portions 7c of the two, left and right, upright tabs 7b of the bracket 7 and the distal portion 9a of the joiner 9. This permits the hinge 5b of the lid plate reinforcement 5 to be bent in a direction parallel to the uppermost edge of the lid plate 4 and from the bent extension 9c of the joiner 9 when the airbag element 6 inflates, thus lifting up the lid plate 4.

Moreover, the upright extension 5f extending from the hinge 5b of the lid plate reinforcement 5 is joined by bolts 10 and nuts 11 to a combination of the distal portion 9a of the joiner 9 and the joining portions 7c of the two, left and right, upright tabs 7b of the bracket 7. This allows the lid plate 4 to be opened up while the hinge 5b of the lid plate reinforcement 5 is bent in a direction parallel to the uppermost edge of the lid plate 4 upon inflation of the airbag element 6 and makes the assembly of the airbag system easy.

While the foregoing description of the embodiment of the present invention is based on the vehicle with the steering wheel situated on the left side, the present invention may be applied to a vehicle with the steering wheel situated on the right side where the passenger-side airbag system is installed at the corresponding position. Although the perforations are provided at the outer edge of the lid plate in the embodiment for ease of the opening of the lid plate, they may be replaced by a length of groove scored circumferentially at the outer edge of at least one of two sides of the lid plate.

It is understood that the bracket 7 of the embodiment is not limited to a single unit having two, left and right, arms but may consist of two, left and right, separate members.

As set forth above, a feature of the present invention involves combining the lid plate installed opposite the opening of the airbag case and the instrument panel cover as a single unit, whereby the cover section viewed from the interior of the vehicle or the automobile will appear favorable as compared with the conventional arrangement of a lid plate and a cover provided separately.

Also, while the lid plate has its outer edge reduced in physical strength, the main body of the lid plate reinforcement made of a metallic material is fixedly joined by thermal bonding to the back side of a region inside the outer edge of the lid plate and the hinge extending upward from the main body of the lid plate reinforcement is fixedly joined by the bracket to the airbag case. When the vehicle or automobile is involved in a collision, the airbag element accommodated in the case is inflated by a flow of gas, hence opening up a major part of the lid plate formed as an integral part of the cover. More particularly, the inflation of the airbag element causes the hinge of the lid plate reinforcement extending from its main body to be bent. As the lid plate is opened up, a part of the airbag element inflates and expands towards the rear side of the vehicle, hence protecting the chest and head of the passenger sitting in the front passenger seat from striking against the lid plate or the main body of the lid plate reinforcement.

As a result, the damage to the passenger sitting on the front passenger seat will be minimized and the generation of sharp edges or the scattering of broken pieces of the cover will be avoided, thus ensuring the protection and safety of the passenger.

According to another feature of the present invention, the passenger-side airbag system has a multiplicity of perforations or a length of groove is provided circumferentially at the outer edge of the lid plate by laser cutting for ease of opening of the lid plate when the airbag element is inflated. This improves the safety of the inflation of the airbag element without malfunction. Also, the lid plate can neatly be broken off along the outer edge, hence minimizing the generation of sharp edges or broken pieces.

According to a further feature of the present invention, the passenger-side airbag system comprises a hinge extending from the center along the leftward and rightward directions of the uppermost portion of the main body of the lid plate reinforcement and arranged shorter in the length along the leftward and rightward directions than the main body, whereby the lid plate and the lid plate reinforcement can easily be lifted or opened up when the. airbag element is inflated.

According to a feature of the present invention, the passenger-side airbag system comprises a bracket formed of substantially a C-like shape comprising a pair of mounting portions provided at both, left and right, ends with mounting holes for joining to the airbag element, and two, left and right, upright tabs formed by bending extensions of die mounting portions. Since the upper ends of the two, left and right, upright tabs of the bracket are joined to the joiner and the upright extension of the lid plate reinforcement, the airbag case is prevented from deforming about its opening when the airbag element is inflated and exerts a force of impact onto the airbag case. Also, the hinge of the lid plate reinforcement is prevented from twisting and from having adverse effects when it is bent, thus ensuring the reliability and safety in its parallel lifting up.

According to a feature of the passenger-side airbag system of the present invention, the main body of the lid plate reinforcement has a number of vertically extending recesses provided therein for. reinforcement and spaced from each other along the leftward and rightward directions. Also, plural sets of vertical slots are provided in the main body of the lid plate reinforcement to be located between the recesses and outside the leftmost and rightmost recesses, allowing the back side of the instrument panel cover made of a molded form of synthetic resin to be joined to the slots of the lid plate reinforcement by thermal bonding. As a result, the lid plate will be prevented from easily detaching from the lid plate reinforcement in case it collides with any object upon the inflation of the airbag element.

According to a feature of the passenger-side airbag of the present invention, the airbag case is held in the inner space defined by the cover, the core, and the lid plate reinforcement, with the upright extension formed by folding backward and then upward the hinge of the lid plate reinforcement and the distal end of the joiner fixedly joined to the left and right upright tabs of the bracket, the mounting portions of the bracket fixedly joined to an upper region of the airbag case, and the proximal ends of the joiner fixedly joined to a boss of the instrument panel cover. This allows the cover, when the boss is broken during the inflation of the airbag element accommodated in the airbag case, to be prevented from deforming or releasing its broken pieces produced by the collision. Also, as the hinge of the lid plate reinforcement is bent in a direction parallel to the upper edge of the lid plate by the inflation of the airbag element, the lid plate can be lifted or opened up.

What is claimed is:

1. A passenger-side airbag system having an airbag case in which an airbag element is accommodated and of which an opening is located just behind a back side of a specific location of an instrument panel cover which is opposite a front passenger seat, comprising:

a lid plate located opposite the opening of the airbag case and formed together with the cover as a single unit, wherein the physical strength is lessened by forming a row of perforations at intervals of a predetermined distance provided along a peripheral edge throughout the circumference of the lid plate by laser cutting;

a main body of a lid plate reinforcement fixedly joined to a back side of said lid plate, the main body having a hinge at an uppermost end of the main body;

a joiner having proximal upright portions fixed to the back side of said panel cover; and a bracket having left and right ends, the bracket being fixed through the ends to a portion upwardly extending from the hinge;

said bracket shaped of substantially a C shape and having a pair of mounting portions at both of the left and right ends provided with mounting holes therein for joining to the airbag case, wherein left and right upright tabs are formed respectively by bending distal ends of the mounting portions, upper end joining portions in the upright tabs are fixed to both an end portion of the joiner and the upwardly extending portion of the hinge, the mounting portions of the bracket being fixed to the airbag case, so that when the airbag element inflates, the hinge of the lid plate reinforcement is forcedly bent to open out the lid plate.

2. A passenger-side airbag system according to claim 1, wherein the hinge of the lid plate reinforcement extends upwardly from the center along leftward and rightward directions of the main body of substantially a rectangular shape which elongates in the leftward and rightward directions and is shorter in the length along leftward and rightward directions than the main body.

3. A passenger-side airbag system according to claim 1, wherein the lid plate reinforcement has a number of vertically extending recesses provided therein for reinforcement and spaced from each other along the leftward and rightward directions and plural sets of vertical slots provided therein to be located between the recesses and outside the leftmost and rightmost recesses, allowing the back side of the lid plate of the instrument panel cover made of a molded form of synthetic resin to be joined to the slots of the lid plate reinforcement by thermal bonding.

4. A passenger-side airbag system according to claim 3, wherein the airbag case is held in an inner space defined by the cover, a core, and the lid plate with an upright extension formed by folding backward and then upward the hinge of the lid plate reinforcement and a distal end of the joiner fixedly joined to the left and right upright tabs of the bracket, the mounting portion of the bracket fixedly joined to an upper region of the airbag case, and a proximal end of the joiner fixedly joined to a boss of the instrument panel cover.

5. A passenger-side airbag system according to claim 1, wherein the airbag case is held in an inner space defined by the cover, a core, and the lid plate reinforcement with an upright extension formed by folding backward and then upward the hinge of the lid plate reinforcement and a distal end of the joiner fixedly joined to the left and right upright tabs of the bracket, the mounting portion of the bracket fixedly joined to an upper region of the airbag case, and a proximal end of the joiner fixedly joined to a boss of the instrument panel cover.

* * * * *